INVENTOR
EDWARD M. SPLAINE
BY
ATTORNEY

June 10, 1952     E. M. SPLAINE     2,599,789
METHOD OF ADJUSTING OPHTHALMIC MOUNTINGS
Filed Oct. 8, 1945     5 Sheets-Sheet 2

INVENTOR
EDWARD M. SPLAINE
BY
Louis L. Gagnon
ATTORNEY

June 10, 1952  E. M. SPLAINE  2,599,789
METHOD OF ADJUSTING OPHTHALMIC MOUNTINGS
Filed Oct. 8, 1945  5 Sheets-Sheet 3

INVENTOR
EDWARD M. SPLAINE
BY
ATTORNEY

June 10, 1952 E. M. SPLAINE 2,599,789
METHOD OF ADJUSTING OPHTHALMIC MOUNTINGS
Filed Oct. 8, 1945 5 Sheets-Sheet 5

INVENTOR
EDWARD M. SPLAINE
BY
Louis L. Gagnon
ATTORNEY

Patented June 10, 1952

2,599,789

UNITED STATES PATENT OFFICE 2,599,789

METHOD OF ADJUSTING OPHTHALMIC MOUNTINGS

Edward M. Splaine, Southbridge, Mass., assignor to American Optical Company, Southbridge, Mass., a voluntary association of Massachusetts Application October 8, 1945, Serial No. 620,903

3 Claims. (Cl. 29—20)

This invention relates to improvements in ophthalmic mountings and has particular reference to novel means and methods of shifting and controlling the positional relation of the parts of such mountings.

One of the principal objects of the invention is to provide novel means and methods of shifting the height of bridge with respect to a horizontal center line passing through the optical centers of the lenses while retaining said positions of said optical centers substantially constant with respect to the pupils of the eyes and while retaining the interpupillary distance substantially unaltered to accommodate for different heights of crests of noses for different individuals while retaining the bridge sizes substantially constant as to angle of bridge and distance between nose bearing pads, or for maintaining a normal constant bridge height while altering the angle of the upper peripheral edge portions of the lenses or rims of the mounting to more nearly follow the angle of the brow line according to the requirements of different individuals or for altering the height of temple endpieces while retaining the bridge size and height substantially constant and while retaining the normal folding axes of the temple endpieces substantially unaltered relative to each other and while retaining the horizontal axes of the temples substantially unaltered when folded or for raising and lowering the positions of the optical centers of a given pair of lenses with respect to a fixed bridge height and size according to the requirements of different individuals while substantially retaining the interpupillary distance between the centers of the lenses or for raising and lowering the lower contour edges of the lenses with respect to the cheek lines according to the requirements of different individuals.

Another object is to provide an ophthalmic mounting with parts which may be varied as to positional relation with each other with said mounting having a portion thereof adjacent the opposed sides of the bridge which remains to substantially constant shape and which provide datum points for accurately positioning lenses of controlled different shapes in said frame, which datum points function to properly locate the horizontal axes of the respective lenses in substantially proper aligned relation.

Another object is to provide an ophthalmic mounting having given controlled size of lenses or rims so shaped for said given controlled size that the distance of the lower nasal and temporal edges of the lenses from the vertical center lines of said lenses will be greater than with known commercial lenses of corresponding sizes whereby an increased lower field of corrected vision is obtained.

Another object is to provide an ophthalmic mounting formed of non-metallic material having rim portions which may be altered as to shape by controlled amounts for shifting the positional relation of parts such as the bridge, nose bearing portions or temple endpieces with respect to the optical centers of lenses positioned in said rim portions according to the requirements of different individuals.

Another object is to provide a plurality of series of lenses of graded sizes having portions thereof on the temporal sides of their vertical center lines of substantially constant size and shape for each respective series and having portions thereof on the nasal sides of said vertical center lines formed to substantially constant shape and size and having their upper and lower edges arranged in substantially equally graded angles of inclinations with respect to the horizontal center lines of the lenses whereby the said lenses of the respective series, when positioned in an ophthalmic mounting of corresponding size, will shift the related positions of the bridge or the related positions of the temple endpieces upwardly or downwardly given controlled graded amounts with respect to said horizontal center line or alter the angles of the upper and lower edge portions by different graded angles of inclination while retaining the bridge and nose bearing pads substantially unaltered as to shape and size or while retaining the longitudinal axes of the endpieces in alignment.

Another object is to provide a novel series of formers possessing shape characteristics simulating the graded shapes desired for the respective series of lens shapes according to the invention.

Another object is to provide novel means and methods of shifting the positional relation of the parts of an ophthalmic mounting according to the requirements of different individuals while retaining the dimensional characteristics of said parts and longitudinal axes of the temple endpieces in substantially aligned relation with each other.

Another object is to provide a novel method and means for controlling the shapes of the lenses of a given formed series of constant size to shift the height of the bridge and nose bearing pads of a mounting embodying said lenses upwardly or downwardly with respect to the centers of the lenses while retaining the position of the centers of the respective lenses substantially constant and while retaining the major axes of the lenses substantially unaltered.

Another object is to provide a series of lenses of substantially constant size and having portions of the contour shapes thereof altered graded amounts relative to each other whereby the temple endpieces of an ophthalmic mounting of corresponding size may be raised or lowered with respect to the position of the bridge and nose bearing pads of the mounting while retaining the horizontal axes of said endpieces in substantial alignment with each other whereby the height of endpiece may be varied according to the requirements of different individuals.

Another object is to provide a series of lenses of the above character having portions of the contour shapes thereof so altered and graded with respect to each other as to raise or lower the bridge and nose bearing pads relative to the horizontal center line of the mounting while retaining the temple endpieces at a substantially fixed position.

Another object is to provide a series of lenses having portions of the contour shapes of each of the respective lenses of the series altered by controlled graded amounts while retaining the shapes of the nasal edges of the lenses, the overall vertical height of the lenses, the horizontal length of the lenses and the positions of the optical centers of the lenses substantially constant.

Another object is to provide frame type ophthalmic mountings formed of heat softenable and expandable material and to different graded sizes according to standard commercial practice and to provide a series of lenses for each given size of mounting for altering the positional relation of parts of said mounting according to the requirements of different individuals and without introducing a change of size as required by said individual.

Other objects and advantages of the invention will become apparent from the following description taken in connection with the accompanying drawings and it will be apparent that many changes may be made in the details of construction, arrangement of parts and steps of the method shown and described without departing from the spirit of the invention as expressed in the accompanying claims. I, therefore, do not wish to be limited to the exact details of construction, arrangement of parts and steps of the method shown and described as the preferred form only has been given by way of illustration.

Referring to the drawings.

Figure 4:
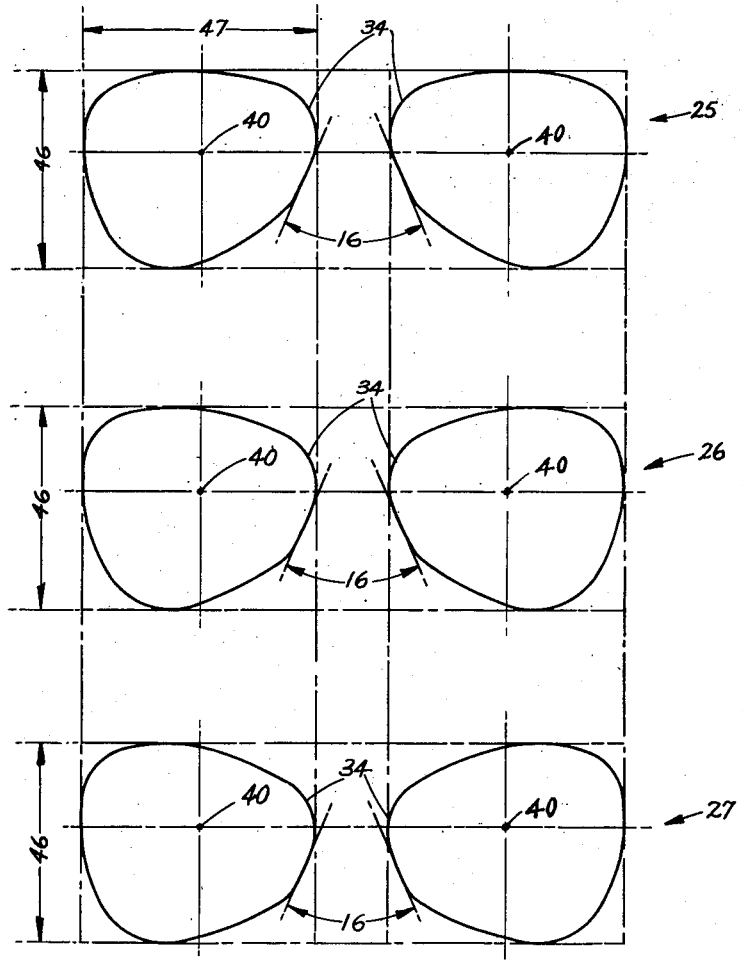
Fig. 4 illustrates a series of lenses of a size corresponding to the size of mountings shown in Figs. 1, 2 and 3 and having their contour shapes altered according to the present invention.
Figure 10:
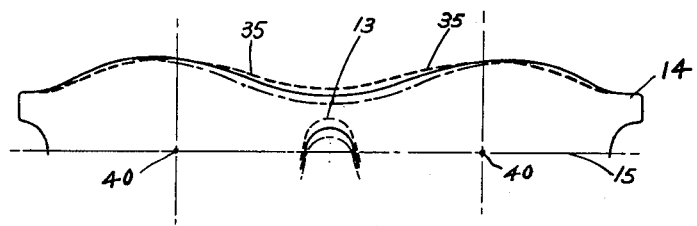
Figure 11:
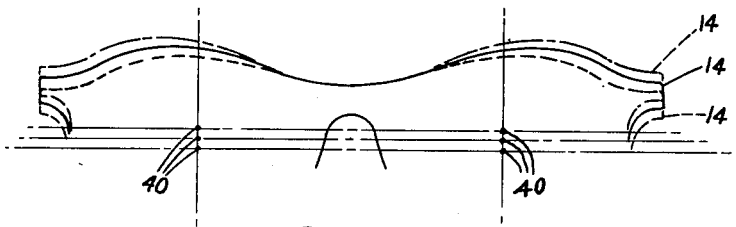

Fig. 10 is a diagrammatic view illustrating how the height of the bridge may be varied with respect to a given horizontal center line without shifting the height of the temple endpiece with respect to said line as accomplished by the lenses of Fig. 4; and Fig. 11 is a diagrammatic view illustrating how the bridge height may be held constant and the height of the temple endpieces may be varied with respect to the bridge as accomplished by the same lenses and in instances when no change of bridge height is required.

It has been usual in the past, particularly with non-metallic mountings, to provide the dispensers with a relatively large stock of mountings having different standardized bridge sizes, eye sizes and interpupillary distances. Such mountings were designed with the thought of providing a size of mounting which could be selected according to the individual's requirements. Such mountings were fabricated with the particular parts thereof in predetermined positional relation with each other with no provision being made for altering said relation of parts.

It has been found, however, that such prior art mountings were inadequate in fulfilling the fitting requirements of different individuals as some individuals, although having the same distance between the pupils of the eyes, required much wider or larger bridge size, different height of bridge, different size of eyes or height of temple.

A further finding, from the aesthetical viewpoint, is that different individuals have different angled brow lines and no provision has been made with such prior art mountings to enable the adjustment of such mountings to meet such requirements.

Some attempts have been made with prior art mountings of this type to provide frames having bridge members located at different heights. Other attempts have been made to provide different designs of fronts with a view to meeting the above mentioned aesthetical requirements. With most prior art mountings of this nature, however, no particular concern has been made of height of temple other than to establish a relatively fixed standardized height for all individuals.

Although such prior art mountings did provide some means of meeting the requirements of different individuals, one of the major drawbacks was that the dispensers had to keep a relatively large stock of mountings on hand not only of different sizes but also of different shapes and designs and in many instances accurate fittings could not be obtained.

Such prior art mountings also introduced much difficulty in that they were designed to receive a lens of the particular rim shape of the mounting.

Some attempts have been made, however, in order to meet requirements of fitting and aesthetical requirements, to use lenses of a shape other than those for which the rims were initially designed. This practice, however, introduced further difficulties in that such different lens shapes in most instances caused the endpieces to be moved out of alignment, that is, to be either tilted upwardly or downwardly with the result that the temples would not fold into alignment with each other when in closed position, also in many instances caused the lenses to rotate off axis when in final secured relation in the rims with the resul that the lenses did not introduce the proper prescriptive correction required particularly when lenses of a cylindrical type were prescribed and also cause the optical centers to be moved from desired position before the eyes, changed the shape and fit of bridge and also introduced undesirable strains and stresses in the lenses.

The present invention, therefore, is directed particularly to overcoming all of the above difficulties through the provision of frames of an initial given size and shape and a series of lenses designed particularly for use with said frame whereby the initial frame may be altered to meet the requirements of different individuals without changing the size of the frame. Another feature of the invention is the provision of a series of formers for use in producing such lenses with the lenses being designed so as to have nasal and temporal edge portions of substantially the same contour shape and size and to have their upper and lower edges angled by different controlled graded inclinations.

This particular series of lenses enables several different adjustments to be obtained. For example, the height of bridge may be altered to meet the requirements of different individuals without changing the angle between the nose bearing pads, the height of endpieces may be varied without changing the height of bridge, the upper portions of the rims may be angled different controlled graded amounts for different angles of eyebrows and the lower portions of the rims may be raised or lowered for proper clearance of cheek lines.

One of the unique features is that all of the above changes may be obtained while retaining the longitudinal axes of the endpieces in proper alignment with each other and without altering the initial dimension of the mounting or size of lens rim.

With the above arrangement the height of bridge may be varied without shifting the position of the optical centers of the lenses or changing the distance between the centers of the lenses. If the centers of the lenses are desired to be shifted, this may be accomplished in the usual prior art manner.

The above, therefore, enables a great reduction in the amount of stock to be carried by the dispensers, affords a wide latitude of adjustment of the various parts both as to fit and for the purpose of meeting the aesthetical requirements of different individuals and while retaining the temple endpieces in constant alignment with each other with the result that the temples will maintain said alignment when in folded position.

The above, therefore, not only provides means for meeting the initial size requirements of an individual but also affords a wide latitude of adjustments heretofore not obtainable by prior art mountings of this nature in order to meet the various other fitting and aesthetical requirements with the optical and prescriptive positions of the lenses relative to the eyes being maintained.

Referring more particularly to the drawings wherein like characters of reference designate like parts throughout the several views and for ease of illustration of the present invention, a frame type mounting will be described.

Figure 1:
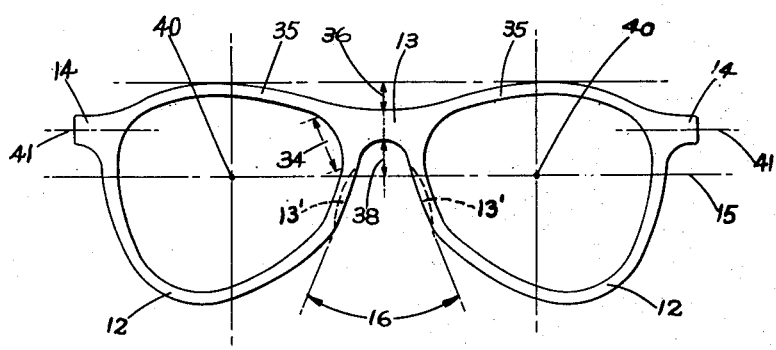
Figs. 1, 2 and 3 are face views of a particular size of mounting altered as to positional relation of parts according to the present invention.

In following the teachings of the present invention a frame such as shown in Fig. 1 having a pair of lens rims 12 joined by a central bridge member 13 having nose bearing pads 13' and having temple endpieces 14 is first formed to a given size and shape and with the various parts in fixed positional relation with each other.

Figure 2:
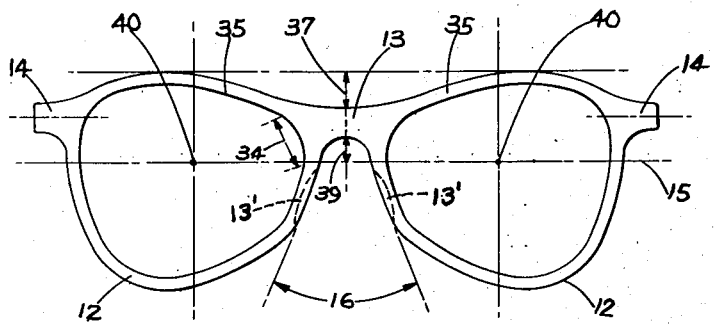
Figure 8:
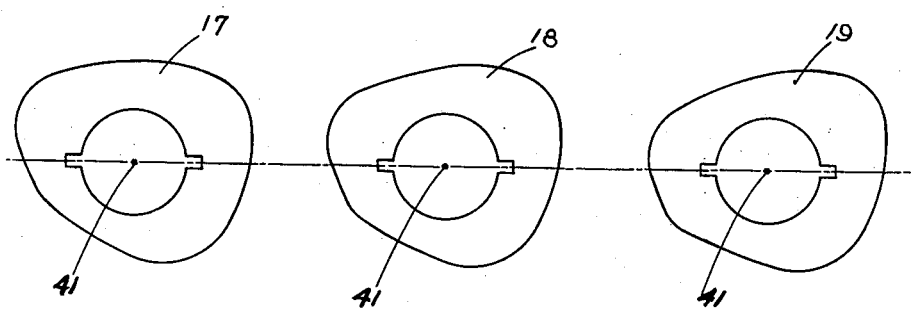
Fig. 8 is a face view of a series of formers of shapes corresponding to the shapes of mountings of Figs. 1 through 3 and from which lenses such as illustrated in Fig. 4 may be formed.

In order to meet the general overall size requirements of different individuals and following the prior art practice such frames are formed to different graded sizes. These frames are dispensed with the various parts thereof such as the bridge, temple endpieces, rims, etc. in initially standardized size and positional relation with each other as shown more particularly in Fig. 2, that is, having a given bridge size and shape 13, height of temple endpieces 14 above the center line 15, height of bridge above said horizontal center line 15 and with a given angle 16 between the nose bearing pad portions 13' of the mounting. Frames such as shown in Fig. 2 are stocked by the dispenser and the dispenser is provided with a series of formers 17, 18 and 19 such as shown in Fig. 8 with the former 18 being of the shape corresponding to the shape of the rims 12 of Fig. 2.

If it is desired or found necessary to raise the bridge 13 a greater amount above the horizontal center line 15 as shown in Fig. 1 to meet the requirements of a particular individual having a high arched nose, the former 17 is selected for edging the lenses to be used in bringing about the raised bridge effect illustrated in Fig. 1. The former 17 is mounted on the spindle 20 of a conventional lens edging machine such as shown diagrammatically in Fig. 9. The lens 21 to be edged is clamped between the conventional pads 22 of the edging machine and the shape of the edged lens as formed by the rotating stone 23 is controlled by the contact of the former 17 with the former shoe 24 in the usual manner. The lens shapes resulting from the use of the series of formers 17, 18 and 19 are illustrated in Fig. 4. The former 17 produces the shape of the lenses 25; the former 18 produces the shape of the lenses 26; and the former 19 produces the shape of the lenses 27.

It is to be understood that only a few shapes are shown in the drawing for ease of description of the invention and that the invention applies to more shapes as desired but the same law which applies to the obtaining of the shapes and the results obtained by using said lens shapes must be retained as will be described more clearly hereinafter.

Figure 5:
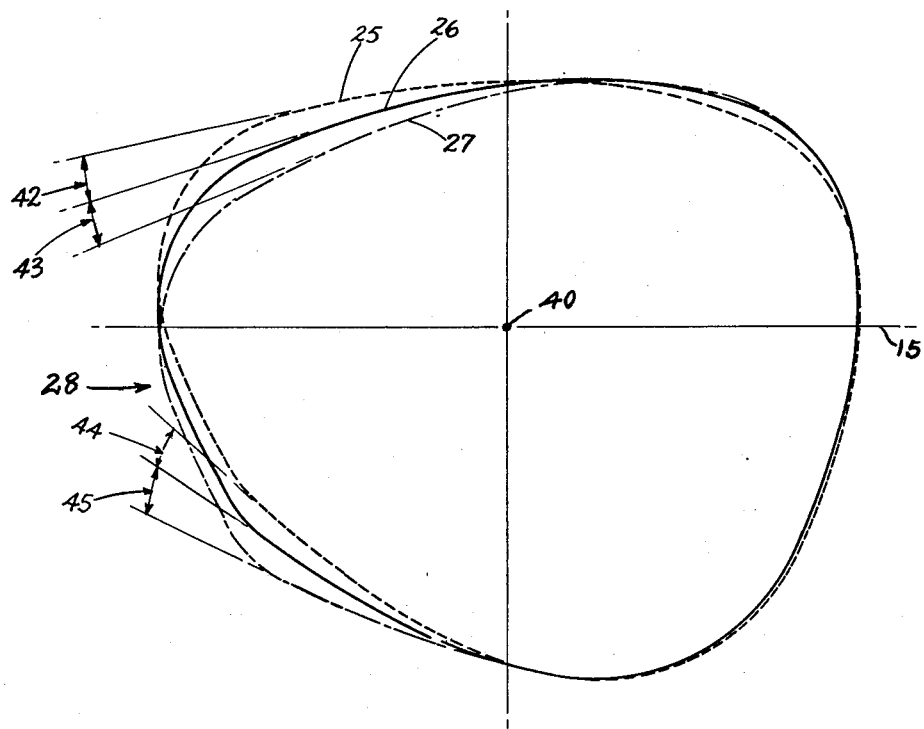
Fig. 5 is a diagrammatic enlarged face view of the respective lenses on the right-hand portion of Fig. 4 positioned in superimposed relation with each other and illustrating the graded angular relation of portions of the contour edges thereof.
Figure 7:
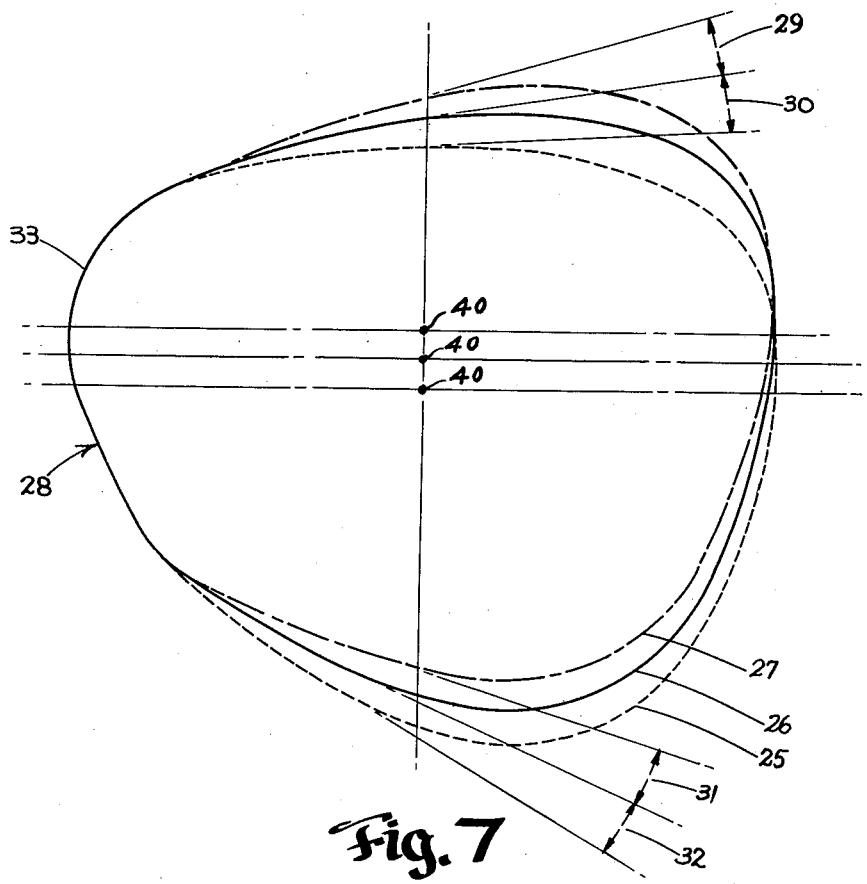
Fig. 7 is a view generally similar to Fig. 5 of lenses of the same corresponding shapes with the nasal portions of the respective lenses positioned in aligned relation with each other and illustrating the altered angular relation of the upper and lower contour edges of the lenses relative to each other.

It is to be particularly noted by reference to Figs. 4, 5 and 7 that the lenses have substantially the same identical shape 28 on the nasal sides thereof. This is more clearly illustrated in Fig. 7. The lenses when positioned in superimposed relation with each other as illustrated in said figure have their upper edges angled relative to each other by substantially equally graded amounts as shown at 29 and 30. The lower edges are likewise angled with respect to each other substantially equally graded amounts as illustrated at 31 and 32 so that the lens shape 25 as formed by the former 17 will be of the shape illustrated by the dash lines. The lens shape 26 as formed by the former 18 will be as shown by the full line and the lens shape 27 as formed by the former 19 will be as shown by the dot and dash lines. The contour of the upper nasal edge 33 of each of the respective lenses is substantially the same and corresponds to the inner contour edge portion 34 of the frame or mounting illustrated in Figs. 1 through 3. It is to be understood, of course, that the rims 12 have the usual inner bevelled circumferential groove formed therein to receive the bevelled edges of the lenses to be fitted therein as is usual in the art.

The mounting in this particular instance is formed of heat softenable and expandable material such as cellulose nitrate, cellulose acetate or any other desirable resinous material known in the art having the characteristics of contracting or shrinking after having been expanded by heat and then allowed to cool.

It is particularly pointed out that the shape of the edge portion 34 will remain substantially unaltered when the rims are heated and expanded by the usual methods employed in the art. One of the most convenient methods is to provide a tapered heated mandrel on which the rim which constitutes one eye portion of the frame may be placed and pressed downwardly of the taper after the material of the rim has been sufficiently heated. The reason that the edge portion 34 remains substantially unaltered is due partly to the fact that it is located near the solid integral bridge member 13.

Care is also taken during the heating and expanding of the rim that the angle 16 remains substantially constant after the lenses have been properly placed in the rims.

As stated above when it is desired to raise the bridge 13 relative to the horizontal center line as shown in Fig. 1, lenses of the shape 17 are employed. This causes the angle of the upper portions of the rims 35 to be more shallow as illustrated at 36 than the previous initial angle as illustrated at 37 and thereby causes the height of the bridge above the horizontal center line 15 as illustrated at 38 to be greater than the initial height 39.

It is particularly pointed out that while the angle of the upper rim portions 35 has been made more shallow the position of the optical centers 40 remains substantially unaltered and the horizontal axes 41 of the temple endpieces 14 remain in aligned relation with each other, that is, they have no tendency to turn upwardly or downwardly as has been the usual experience when lenses of a different shape than the initial shape of the prior art lens rims were placed in said rims by heating and expanding the rims, snapping the lenses therein and then allowing the rims to cool and shrink about the contour edges of the lenses.

While raising the height of the bridge as described above, it is also to be noted that the angle of the upper rim portions 35 is changed from that of the angle of Fig. 2 so that in this manner the upper rim portions 35 may be made to follow more nearly the brow line of an individual having relatively shallow angled eyebrows. If the brow line should angle upwardly an amount greater than the angle of the upper portions 35 of Fig. 2, this increased angling may be accomplished by using lenses 27 as formed by the formers 19. This will cause the angle between the upper portions 35 to be greater as illustrated at 52 in Fig. 3 and will cause the height of bridge to be decreased beyond that of Fig. 2 as illustrated at 51 in Fig. 3. It is to be noted that this angling can be accomplished while bringing about substantially no change in the height of the temple endpiece relative to the horizontal center line 15. This changing of the angle of the upper rim portions 35 and the shifting or altering of the height of the bridge 13 without changing the height of the temple endpieces relative to the horizontal center line is diagrammatically illustrated in Fig. 10. The above illustrates some of the accomplishments of the present invention.

If, however, it is desired for some particular individual to have higher endpieces, as illustrated in Fig. 11, without altering the height of the bridge, this can be accomplished by the proper selection of lens shape. In this particular instance the position of the optical centers 40 will be altered slightly. This shift of position of the optical centers, however, can be controlled at the time the lens is being edged by an edging machine such as diagrammatically illustrated in Fig. 9, that is, the position of the optical center may be controlled by the usual methods employed in the ophthalmic art by merely shifting the lens 21 in its centering holder prior to placing it between the clamp pads 24. While speaking of the position of the optical centers of the lenses, it is to be noted that the formers, Fig. 8, are centered about their geometrical centers 41 but when the lens blank having its optical center mark thereon is positioned and held in the lens edging machine by the bearing or clamp pads 22, the optical center of the lens being edged will be positioned approximately 3½ mm. above the geometrical center of the former. One of the reasons for centering the formers about their geometrical centers is to provide ample material on all sides of the centers of the formers. This practice, however, is standard in the ophthalmic art and is known by lens dispensers.

Fig. 7 diagrammatically illustrates how the height of the temple endpieces may be varied through the proper selection of shape of lens when the bridge height is held constant.

Fig. 5 illustrates how the height of the bridge may be varied while retaining the height of the temple endpiece substantially constant through the use of the same series of lenses. This is brought about by changing the angle of the upper edges of the lenses on the nasal side of the vertical center line by substantially equal increments as illustrated at 42 and 43 and by changing the angle of the lower edges of the lenses on the nasal sides thereof substantially equally graded amounts as illustrated by the lines 44 and 45.

It is particularly pointed out, by reference to Figs. 5 and 7, that each of the lenses of the series has its upper and lower edges angled relative to each other by substantially constant graded amounts with the nasal edge portions thereof held to substantially constant shape with the result that the shift of height of the endpieces may be varied by substantially equal amounts while retaining the bridge height substantially constant or the bridge height may be varied while retaining the height of temples substantially constant.

This result is obtained while maintaining the overall dimensions of the lenses substantially constant as illustrated in Fig. 4, that is, while retaining the overall height 46 of the lenses substantially constant, the overall length of the lenses 47 substantially constant, the position of the optical centers 40 substantially constant, as when shifting the height of the bridge, and while maintaining the circumferential dimension of the respective lenses of the series substantially the same.

The above results are obtained while retaining the upper nasal edge portions 34 at substantially the same shape and while retaining the angle 16 between the lower nasal edges of the lenses substantially constant.

It is to be understood that several series of lenses controlled in the above manner and of varying sizes such as 38 mm., 40 mm., 42 mm., 44 mm., etc. are provided. The particular series illustrated in Fig. 4 shows that the respective lenses of each series are maintained at a substantially constant size and that this holds true for each respective series of different sizes.

Figure 6:
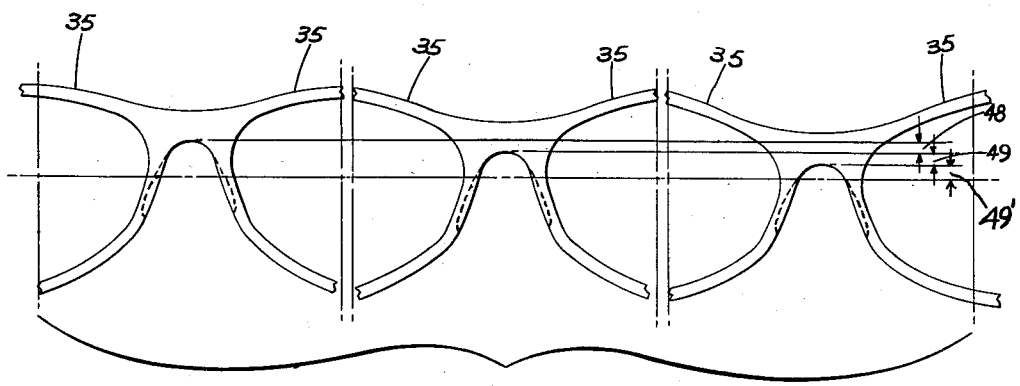
Fig. 6 illustrates fragmentary face views of the bridge and nose bearing portions of the mountings illustrated in Figs. 1 through 3 and more particularly illustrating the graded different heights of bridge with respect to a horizontal line.

Fig. 6 illustrates the shift of height of the bridge which is by substantially equal amounts as illustrated at 48, 49 and 49' and also illustrates the change of shape or angle of the upper portions 35 of the rims relative to each other.

Although applicant has described the above plurality of series of lenses as for use more particularly with a rim type mounting, it is to be understood that such series of lenses may be provided for the forming of rimless or semi-rimless type mountings. This will be more clearly understood by reference to Fig. 4 where it will be particularly noted that the optical centers of all of the different lenses of the series are in a substantially constant position and the vertical center lines of the lenses are in a constant position with the angle between the lenses substantially constant.

In forming rimless type mountings, therefore, the drill position for the bridge for each lens will be along the horizontal center line and by proper selection of the shape the angle of the upper contour edges of the lenses can be selected to more nearly fit the angle of the brow line of the patient for which the mounting is being made. The drill position for the temple endpieces can be at an established distance above the horizontal center line as is common practice in the art.

Although this type of mounting does not introduce all of the difficulties set forth above in connection with rim type mountings, the said series of lenses do afford means for accommodating for aesthetical requirements.

Figure 9:
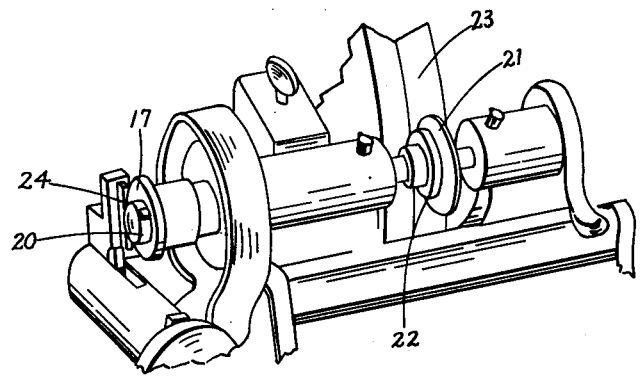
Fig. 9 is a fragmentary perspective view of a lens edging machine illustrating the use of the formers of Fig. 8.

In following the teachings of applicant's invention, although not limited to any particular shape of lens or mounting, it is desirable that the lens shape and frame be so controlled as to obtain substantially maximum field of corrected vision. In endeavoring to meet the requirements of a particular individual the initial frame or mounting, such as shown in Fig. 2, is placed on the face of the wearer and the size of mounting selected depends mainly upon the distance between the centers of the pupils of the eyes of the individual. When a frame of the proper size is selected the dispenser or fitter notes particularly the height of bridge requirement of the individual as well as the height of temple and angle of brow line of the individual. A lens former is then selected which will best meet the all around requirements of the individual and a pair of lenses of the size required to fit the lens rims of the initially selected mounting are edged through the use of an edging machine such as shown in Fig. 9. The lens rims of the selected mounting are then heated and stretched to receive the lenses. In positioning the lenses in the rims care is initially taken that the nasal portion 33 of each lens is properly fitted with the portion 34 of the rims. It is particularly pointed out that these portions will remain substantially unaltered as to shape when the rims are heated and stretched. In general, when the portion 33 is fitted with the portion 34, the lenses will be properly positioned in axial relation within the lens rims. This fitting of the lenses within the lens rims is accomplished by snapping the lenses into the rims and thereafter allowing the rims to cool and shrink into intimate contact with the peripheral edge of the lens. In so doing the upper and lower portions of the rims will be altered from their initial positions controlled angular amounts depending upon the amount of change introduced by the lens shape selected. If it is a lens of the shape of the lens 25 that is used, the bridge will assume a higher position with respect to the horizontal center line of the rims as shown in Fig. 1 and the upper portions 35 will assume a more shallow angular relation with each other. This will cause the upper portions 35 of the rims to more nearly follow the brow lines of individuals having relatively shallow angled brows.

Figure 3:
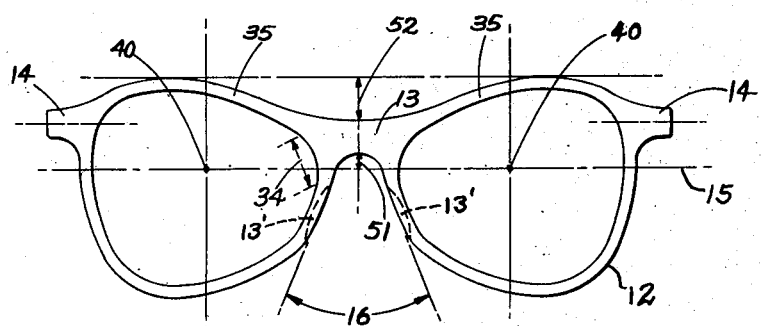

If upon initial trial of the mounting of Fig. 2 it is noted that a greater angled brow line is required, this may be obtained by the selection of the former 19 with the result that the upper rim portions 35 will be angled as illustrated in Fig. 3 which angle is greater than the angle of Fig. 2. If other angles are desired, suitable formers of different shapes are provided in the series.

It is pointed out that only one frame such as shown in Fig. 2 is required to accomplish the above results and this frame is initially selected for its size of bridge, size of eye and interpupillary measurement according to the particular individual's requirement.

If the individual being fitted should not require that the bridge be altered but should require higher temple endpieces, a lens of the shape of lens 27 will be formed and mounted in the rims with the result, as shown in Fig. 7, that the upper portion of the rims will be angled upwardly a greater amount thereby moving the temporal side of the lens upwardly. If the individual should require lower temple endpieces, this is accomplished by the selecting of a lens 25. The resulting effects of the use of such lenses are clearly illustrated in Fig. 11.

It will be seen by the above that the height of bridge, height of temple endpieces and angle of the upper portions of the rims may be quickly and easily altered to meet the requirements of different individuals without introducing an overall size change of mounting.

After the frame is selected, the proper bridge fitting is obtained and the brow line alignment is obtained, the optical centers of the lenses can be lowered or raised to suit the individual's requirements. This change of position of the optical centers, however, is initially determined prior to edging the lenses of the required shape and is accomplished by shifting the marked center of the semi-finished lens blank the amount required to attain the desired result in the lens holder prior to positioning the lens blank in the edging machine.

The above arrangement, therefore, provides a novel series of formers and novel series of lenses for use with a particular initial mounting whereby all of the above objects and advantages of the invention may be obtained while retaining the initial dimensional characteristics of the mounting and while retaining the parts in proper axial alignment with each other.

Having described my invention, I claim:

1. The method of altering the positional relation of the parts of an ophthalmic mounting embodying a pair of lens rims of odd shape having the bridge member on the nasal portions thereof and temple connection members on the temporal portions thereof while retaining the longitudinal axes of said members in substantially parallel relation with a horizontal line extending through the centers of the lens rims, said method comprising altering the angle of the upper and lower contour edge portions of the rims substantially similar amounts with respect to said horizontal line and in the same direction while retaining the angle of the nasal and temporal portions of the rims substantially constant with respect to said horizontal line by bending said upper and lower contour edge portions about axes located adjacent their points of merger with the respective nasal and temporal portions and holding the shape of said portions substantially unchanged whereby the positional height of said members may be altered with respect to said horizontal line while retaining the longitudinal axes of said members in parallel relation and the lens rims to substantially the same general odd shape.

2. The method of altering the positional relation of the parts of an ophthalmic mounting embodying a pair of lens rims having a bridge member on the nasal portions thereof and temple connection members on the temporal portions thereof while retaining the longitudinal axes of said members in substantially parallel relation with a horizontal line extending through the centers of the lens rims, said method comprising holding the shape and relative angular disposition of the nasal and temporal portions of the rims carrying the bridge and temple connection members substantially constant, and moving one of said portions relative to the other in a direction approximately normal to the said horizontal line by bending the upper and lower edge portions of the rims between said nasal and temporal portions held constant in shape adjacent the points of merger therewith whereby the positional height of said members may be altered with respect to said horizontal line while retaining the longitudinal axes of said members in substantially parallel relation.

3. The method of altering the relative height of the bridge of an ophthalmic mounting with respect to a horizontal line extending through the center of the lens rims thereof wherein the mounting embodies a pair of lens rims having a bridge member joined to the nasal portions thereof and temple connection members on the temporal portions thereof, said method comprising holding the shape and relative angular disposition of the nasal and temporal portions of the rims carrying the bridge and temple connection members substantially constant, and moving the nasal portions by equal amounts relative to the temporal portions in a direction approximately normal to the said horizontal line by bending the upper and lower edge portions of the rims between said nasal and temporal portions held constant in shape adjacent the points of merger therewith whereby the height of said bridge member may be altered desired amounts with respect to said horizontal line while retaining the temple connection members and the longitudinal axes of said members in substantially their initial relation.

EDWARD M. SPLAINE.

REFERENCES CITED

The following references are of record in the file of this patent:

UNITED STATES PATENTS

| Number | Name | Date |
|---|---|---|
| 1,193,230 | Brennecke | Aug. 1, 1916 |
| 1,220,600 | Burke | Mar. 27, 1917 |
| 1,406,053 | Maynard | Feb. 7, 1922 |
| 1,425,919 | Tremblay | Aug. 15, 1922 |
| 1,537,733 | Beattey | May 12, 1925 |
| 1,596,019 | Nelson | Aug. 17, 1926 |
| 1,739,268 | Stein | Dec. 10, 1929 |

FOREIGN PATENTS

| Number | Country | Date |
|---|---|---|
| 449,930 | Great Britain | Apr. 18, 1936 |